United States Patent [19]

Mifsud

[11] 4,248,324
[45] Feb. 3, 1981

[54] SEISMIC VIBRATOR AND METHOD FOR IMPROVING THE OUTPUT OF A SEISMIC VIBRATOR

[75] Inventor: Joseph F. Mifsud, Houston, Tex.
[73] Assignee: Exxon Production Research Company, Houston, Tex.
[21] Appl. No.: 10,117
[22] Filed: Feb. 7, 1979
[51] Int. Cl.³ .............................................. G01V 1/133
[52] U.S. Cl. .................... 181/121; 181/401; 73/666
[58] Field of Search ............... 181/108, 121, 401; 367/189, 190; 73/573, 666; 404/117

[56] References Cited

U.S. PATENT DOCUMENTS

| | | | |
|---|---|---|---|
| 2,910,134 | 10/1959 | Crawford et al. | 181/401 |
| 3,106,982 | 10/1963 | Wade | 181/401 |
| 3,282,372 | 11/1966 | Brown et al. | 181/121 |
| 3,363,720 | 1/1968 | Mifsud et al. | 181/401 |
| 3,578,102 | 5/1971 | Ross et al. | 367/190 |
| 3,840,090 | 10/1974 | Silverman | 181/119 |
| 3,884,324 | 5/1975 | Hamilton et al. | 181/114 |
| 3,929,206 | 12/1975 | Bedenbender | 181/114 |
| 4,014,403 | 3/1977 | Mifsud | 367/190 |
| 4,147,228 | 4/1979 | Boryancos | 181/121 |

*Primary Examiner*—Nelson Moskowitz
*Attorney, Agent, or Firm*—George E. Glober

[57] ABSTRACT

A method and apparatus for improving the power output of a seismic vibrator are provided. Compliant elements with variable stiffnesses are interposed between and connected to the holddown mass and the baseplate. When the compliant elements have a first stiffness, the vibrator-earth system has a first resonant frequency. When the compliant elements have a second stiffness, the vibrator-earth system has a second resonant frequency. During sweep, the compliant elements are set on the first stiffness until the vibrator has passed through the first resonant frequency; then the compliant elements are changed to their second stiffness and the sweep continues through the second resonant frequency.

15 Claims, 7 Drawing Figures

SEISMIC VIBRATOR AND METHOD FOR IMPROVING THE OUTPUT OF A SEISMIC VIBRATOR

BACKGROUND OF THE INVENTION (1) Field of the Invention

The present invention relates to improvements in vibrators used to create seismic waves for seismic prospecting. More particularly, it relates to an improved seismic vibrator and to a method for improving the output of a seismic vibrator.

(2) Description of the Prior Art

In seismic prospecting, it is necessary to provide a source of energy for introducing waves into the earth formation to be explored. These waves propagate through the formation, are reflected in part by discontinuities in the formation, and subsequently are detected by geophones or other measuring devices at the earth's surface. The characteristics of the reflected waves are compared with the characteristics of the waves at their introduction into the formation. This comparison reveals valuable information about the structure of the formation and the probability of the presence of petroleum accumulations in the formation. In order to induce waves in the earth, it has become common to use mechanical devices known as seismic vibrators such as those illustrated in U.S. Pat. No. 3,929,206 (1975) to Bedenbender et al and U.S. Pat. No. 3,363,720 (1968) to Mifsud et al.

A typical seismic vibrator includes a baseplate in contact with or coupled to the earth, a holddown mass disposed above and connected to the baseplate so as to exert on the baseplate a downward or holddown force which tends to keep the baseplate in contact with the earth, a reaction mass connected to the baseplate to permit reciprocation of the reaction mass with respect to the baseplate, and a driver which reciprocates the reaction mass with respect to the baseplate in order to vibrate the baseplate at desired frequencies and amplitudes. The vibrations of the baseplate cause seismic waves to propagate through the earth. Usually elastic isolation springs, which may be referred to generally as compliant elements or compliant members, are interposed between the holddown mass and the baseplate to isolate the holddown mass from the vibrations of the baseplate, while at the same time maintaining the holddown force relatively constant. Frequently the driver includes a hydraulic piston or other reciprocating device which is responsive to an electric input signal.

In operation, an electrical input or sweep signal of know characteristics is impressed on the driver for the purpose of causing the baseplate to create seismic waves of similar characteristics in the earth. Typically, but not always, the sweep signal will be sinusoidal. The range of frequencies over which the baseplate is swept may be referred to as the sweep range and typically will be the range of frequencies from about 5 Hertz to about 100 Hertz. The vibrator may be swept up from the lower end of its sweep range to the higher end, or it may be swept down from the higher end of its sweep range to the lower end. The reflected seismic waves then are detected and compared with the sweep signal. Often a seismic vibrator will be mounted on a truck to carry it to desired locations and during operation all or part of the truck's weight is applied to the baseplate, so that the holddown mass referred to above will include all or part of the mass of the truck.

Most seismic vibrators of the type described above resonate with the earth when the baseplate is vibrating within a certain band of frequencies. This band of frequencies is quite narrow compared with the sweep range over which the vibrator operates, and the band may be referred to as the natural or resonant frequency of the vibrator-earth system, or simply the resonant frequency. This resonant frequency is a function of the impedance of the earth, the mass of the baseplate, the magnitude of the reaction mass, the stiffness of the isolation springs, and other factors. This resonant frequency does not necessarily occur within the sweep range, but frequently does and might be expected to occur for many vibrators presently in use between 15 Hertz and 25 Hertz. This invention is directed primarily to vibrators having a sweep range which includes the resonant frequency of the vibrator-earth system.

As a vibrator is swept through its sweep range, the magnitude of the displacement of the baseplate, and thus the amplitude of the wave generated in the earth formation, will increase as the vibration frequency approaches the resonant frequency and then will fall off as the frequency of vibration becomes less than or greater than the resonant frequency. This relative decline in the magnitude of the baseplate vibrations at frequencies different from the resonant frequency of the vibrator-earth system can be troublesome, because it increases the difficulty of recovering signals at these frequencies reflected from discontinuities in the underlying formation. This is particularly true at the high end of the sweep range, because the attenuation of compressional waves in the earth increases with the frequency of those waves.

Ross et al in U.S. Pat. No. 3,578,102 (1971) propose solving this problem by interposing a compliant element between the reaction mass and the baseplate and by continually adjusting the spring constant or stiffness of this compliant element in order to keep the vibrator at resonance with the earth throughout the generation of the seismic wave. This system appears to require rather precise calibration and maintenance and it may increase the difficulty of maintaining proper coupling between the baseplate and the earth. Wade in U.S. Pat. No. 3,106,982 (1963) proposes shifting the resonant frequency of the vibrator-earth system when the vibrator has a hydraulic driver by changing the volume of the driver's main cylinder. This solution does not permit changing the resonant frequency during a sweep and thus does not prevent the decrease in the amplitude of baseplate vibrations after resonant frequency for that sweep is reached. Crawford et al, while dealing with a different problem in U.S. Pat. No. 2,910,134 (1959), do recognize that changing the spring constant of the compliant element between the holddown mass and the baseplate will change the resonant frequency of the vibrator-earth system. However, like the Wade system, the Crawford system does not permit changing the resonant frequency during a sweep and does not prevent a decrease in the amplitude of the baseplate vibrations after the resonant frequency for that sweep is reached.

SUMMARY

Briefly, applicant solves this problem by establishing, in addition to the standard compliant connection between the holddown mass and the baseplate, a second compliant connection between the holddown mass and the baseplate. The standard compliant connection has a constant stiffness and thus may be referred to as a constant compliant element or connection. However, the second compliant connection has a variable stiffness which is controlled as a function of the frequency of the baseplate vibrations during the sweep, so as to change the resonant frequency during sweep or add one or more resonant frequencies during the sweep, depending on one's point of view. Because the second compliant connection has a variable stiffness, it may be referred to as a variable compliant element or compliant connection. When the variable compliant connection between the holddown mass and baseplate has a first stiffness, the vibrator-earth system has a first resonant frequency; when the variable compliant connection has a second stiffness greater than the first stiffness, then the vibrator-earth system has a second resonant frequency greater than the first (but still within the sweep range).

If the vibrator is swept from low to high frequencies, then the magnitude of the baseplate displacement will increase until the vibrator reaches the first resonant frequency, and thereafter it will begin to decrease. At a preselected frequency in excess of the first resonant frequency, but less than the second resonant frequency, the stiffness of the variable compliant connection is increased, so that the magnitude of the baseplate displacement will again begin to increase until the vibrator reaches the second resonant frequency, and thereafter the displacement magnitude will again begin to fall off. If the vibrator is swept down from the highest frequency of interest to the lowest, then the stiffness of the variable compliant connection first is set to its greater value and is switched to its lesser value after the vibrator passes through the greater resonant frequency.

Thus, this invention improves the power output characteristics of the vibrator, or the amount of energy that the vibrator imparts to the formation over its sweep range.

BRIEF DESCRIPTION OF THE DRAWINGS

In the drawings, wherein like reference numerals refer to like parts and wherein illustrative embodiments of this invention are shown.

DESCRIPTION OF THE PREFERRED EMBODIMENTS

Figure 1:
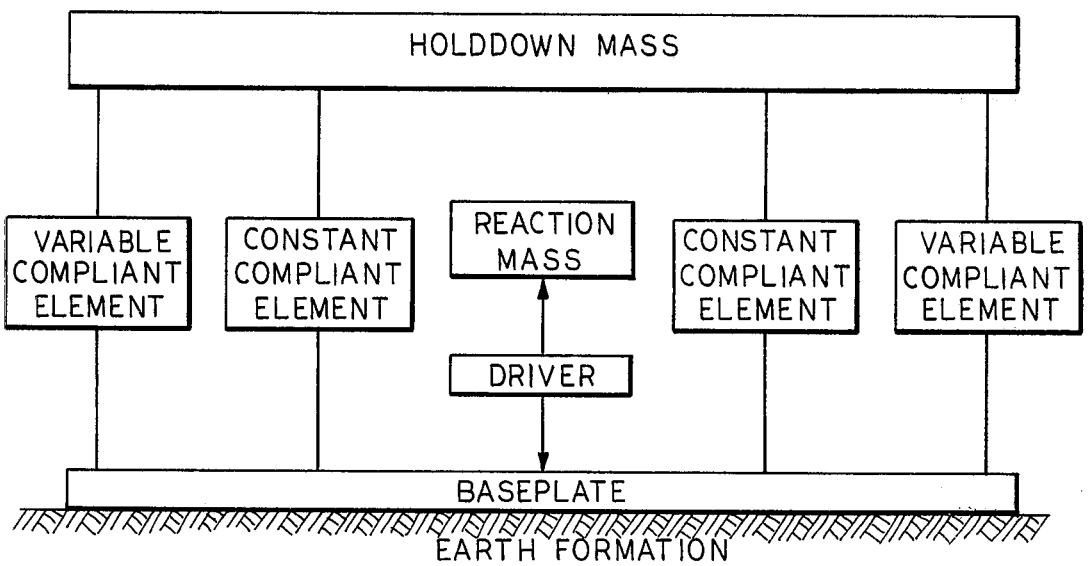
FIG. 1 is a simplified schematic illustration showing the relationship between the major components of a seismic vibrator embodying the invention and in place on an earth formation.

FIG. 1 is a simplified schematic illustration showing the relationship between the major components of a seismic vibrator embodying this invention. The baseplate is in contact with the earth formation. A reaction mass is disposed above and connected to the baseplate and is reciprocated with respect to the baseplate by a driver, in order to induce vibrations in the baseplate and thus in the earth formation. A holddown mass is disposed above and connected to the baseplate to maintain the coupling between the baseplate and the ground as the baseplate vibrates. The usual constant compliant elements are interposed between the holddown mass and the baseplate, in order to isolate the holddown mass from the baseplate vibrations. Two such compliant elements are illustrated in FIG. 1 to show that proper mechanical balance must be maintained if the vibrator is to function well, but fewer or more such compliant elements might be appropriate for a given vibrator. Variable compliant elements are shown adjacent to the constant compliant elements. As is discussed above, the stiffness of these variable compliant elements is changed as a function of frequency during the sweep for the purpose of changing the resonant frequency of the vibrator-earth system or creating additional resonant frequencies of the vibrator-earth system and thereby improving the power output characteristic of the vibrator. For clarity, the vibrator embodying this invention is described as having both constant compliant elements and variable compliant elements between the holddown mass and the baseplate and the preferred embodiment of the invention, illustrated in FIG. 4, has both such compliant elements. However, it is apparent to one skilled in the art that a vibrator embodying this invention could include only variable compliant elements between the holddown mass and the baseplate and that the constant compliant elements are not necessary to the invention, particularly if the variable compliant elements isolate the holddown mass from the baseplate throughout the sweep. In fact, the compliant elements or connections between the holddown mass and the baseplate of the vibrators illustrated in FIGS. 1 and 4 can be viewed collectively as a single compliant connection with a variable stiffness.

Figure 2:
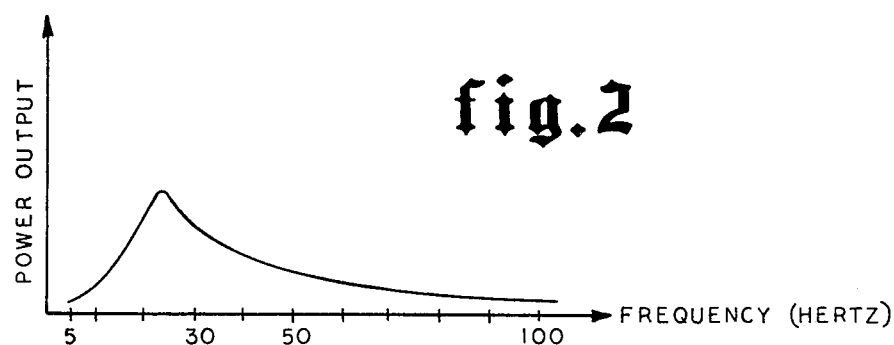
FIG. 2 is a graph showing the power output as a function of frequency of a typical vibrator.
Figure 3:
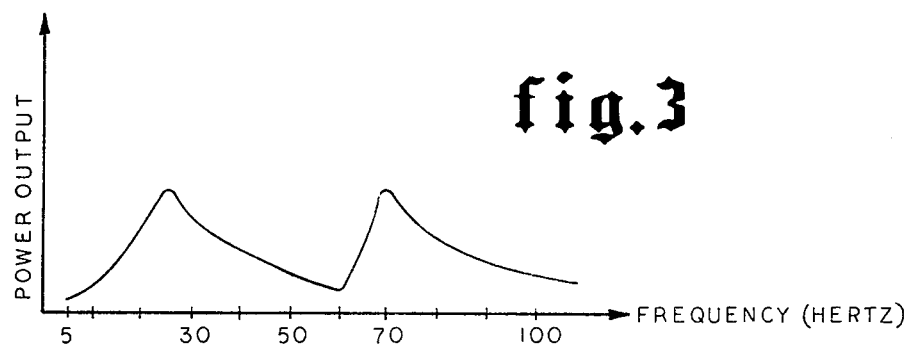
FIG. 3 is a graph showing the power output as a function of frequency of a vibrator embodying the invention.

FIG. 2 shows the power output as a function of frequency of a typical vibrator of the character to which this invention is directed and having only compliant elements of constant stiffness between the holddown mass and the baseplate. Power output increases rather rapidly from about 5 Hertz to a peak at resonance around 25 Hertz and then declines toward zero as frequency increases. FIG. 3 shows the power output as a function of frequency of a vibrator of the character illustrated in FIG. 1 wherein the stiffness of the compliant elements is changed during sweep in accordance with this invention. The power output increases rather rapidly from about 5 Hertz to a peak at resonance around 25 Hertz and then begins to decline. For purposes of illustration, at about 60 Hertz the stiffness of the compliant elements between the holddown mass and the baseplate is increased and the power output of the vibrator begins to climb toward a second peak which is shown to occur at a second resonance around 70 Hertz. Thereafter, the power output again declines as the frequency increases. If the vibrator is swept from high to low frequencies, then the power output follows in reverse the curve shown in FIG. 3. The vibrator starts its sweep with the compliant elements having the greater stiffness, so that the first peak occurs at about 70 Hertz, and the stiffness of the compliant connection then is reduced, so that the second peak occurs at about 25 Hertz, after which the power output declines to zero.

Figure 4:
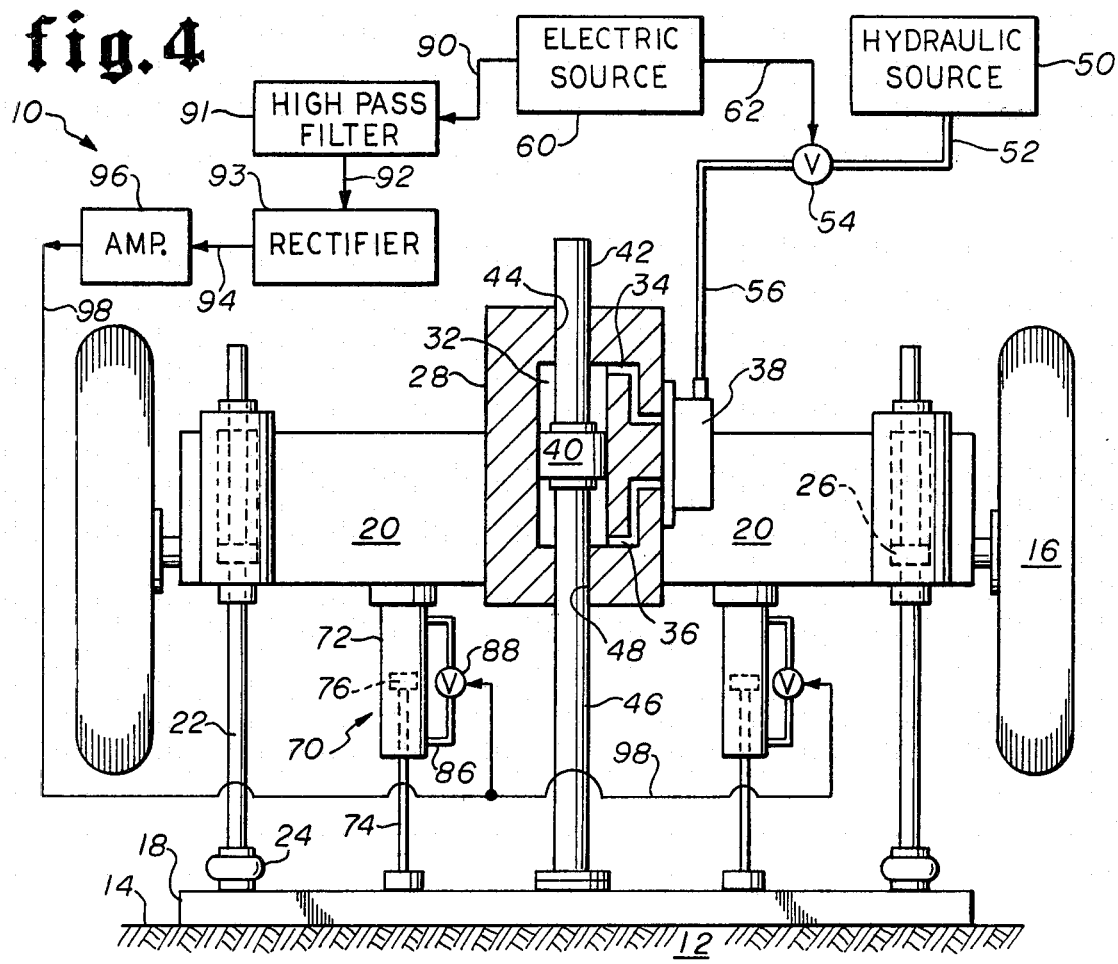
FIG. 4 is a schematic simplified view showing some details of a seismic vibrator embodying the invention and in place on an earth formation.

FIG. 4 shows the details of a hydraulic vibrator 10 embodying the invention and in operating position on an earth formation 12 having a surface 14. For ease of transporation, the vibrator is integrated with a truck or other self-propelled vehicle, whose wheels are shown schematically and designated by the numeral 16. The vibrator includes a planar baseplate 18 coupled to or in contact with the earth surface. A holddown mass 20 is held above baseplate 18 by means of a plurality of support rods 22 which extend downwardly from the holddown mass toward the baseplate and which rest on a plurality of compliant elements or springs 24 which are fixed to the top of the baseplate underneath the support rods. Thus, the holddown mass 20 exerts a downward force on the baseplate through the support rods and springs for the purpose of holding the baseplate in contact with the ground as the baseplate vibrates.

The purpose of the springs 24 is to isolate the holddown mass from the vibrations of the baseplate, while maintaining substantially constant the static downward force of the holddown mass on the baseplate. In practice, the springs may be any springs of suitable resiliency and lateral stability; air springs have been found to be practical.

The holddown mass 20 can be separate from the truck, but for efficiency preferably the holddown mass includes part or all of the mass of the truck and its associated components. The rods 22 may be connected to hydraulically actuated pistons 26 which are operable to lift the wheels of the truck off the surface of the earth (as illustrated in FIG. 4) in order to increase the holddown force on the baseplate.

A reaction mass 28 is disposed above and connected to baseplate 18, is mechanically isolated from holddown mass 20, and is adapted to be reciprocated with respect to baseplate 18 for the purpose of vibrating baseplate 18. Preferably the reaction mass is substantially greater than the mass of the baseplate.

The reaction mass 28 is reciprocated with respect to baseplate 18 by means of a hydraulically operated driver. The driver includes cylindrical chamber 32, passages 34 and 36, manifold 38, piston 40, servo valve 54, and other components, which will now be described. Reaction mass 28 defines a cylindrical chamber 32 and passages 34 and 36 which communicate between chamber 32 and manifold 38. Chamber 32 receives a piston 40. Piston rod 42 is attached to piston 40 and extends upwardly through bore 44 in reaction mass 28; piston rod 46 is attached to piston 40, is coaxial with rod 42, extends downwardly through bore 48 in reaction mass 28, and is rigidly attached to baseplate 18. A source 50 of high pressure hydraulic fluid is provided and is connected by suitable conduit 52 to an electrohydraulic servo valve 54 which in turn is connected by conduit 56 to manifold 38. The valve 54 directs high pressure fluid alternately above and below piston 40 in chamber 32 in order to reciprocate the reaction mass 28 with respect to baseplate 18. Thus, the driver may be said to include chamber 32, piston 40, piston rods 42 and 46, bores 44 and 48, passages 34 and 36, manifold 38, conduits 52 and 56, valve 54, source 50 and related components, many of which are not shown, because such systems are well known to those skilled in the art. While the driver of the preferred embodiment is hydraulic, it will be appreciated that other drivers or means for reciprocating the reaction mass with the baseplate may be provided and that such drivers or means would come within the scope of this invention.

An electric source 60 is connected to valve 54 by conductor 62 and provides an electric input or sweep signal to valve 54 for the purpose of controlling valve 54 and thereby controlling the vibrations of piston 40 and baseplate 18. Typically the input signal will be a swept sine wave whose frequency varies slowly as a function of time over a desired range of frequencies. However, this invention is not limited to sinusoidal input signals; sources which produce other types of input signals may be used. Because the input signal is compared with waves reflected from discontinuities in the earth formation 12, it is preferable to keep the vibrations of baseplate 18 reasonably in phase with the input signal from electric source 60. The two waves can get out of phase with each other primarily because the impedances of the earth and of the various components of the driver vary as function of frequency. In order to keep the waves in phase, a feedback system (not shown) such as that disclosed in U.S. Pat. No. 4,049,077 (1977) to Mifsud may be provided.

For the purpose of varying the stiffness of the overall compliant connection between the holddown mass 20 and baseplate 18, a plurality of hydraulic cylinder and piston assemblies 70 are provided. In the preferred embodiment, illustrated in FIGS. 4 and 5, the cylinders 72 are attached to the holddown mass and the piston rods 74 are attached to the baseplate. A piston 76 is slideably disposed in each cylinder 72 and connected to the end of piston rod 74. Piston 76 defines within each cylinder two chambers 78 and 80, which are filled with hydraulic fluid. Ports 82 and 84 in each cylinder provide communication between chambers 78 and 80 and conduit 86, which forms a loop between ports 82 and 84, so that hydraulic fluid may flow between chambers 78 and 80 through conduit 86.

Valve 88, responsive to an electric input signal, is disposed in conduit 86. In the preferred embodiment, valve 88 is a solenoid-operated hydraulic valve. When valve 88 is open, hydraulic fluid can flow relatively freely through conduit 86, so that the piston encounters relatively little resistance within cylinder 72 and piston rods 74 follow the vibrations of the baseplate relatively freely. However, when valve 88 is closed, the unimpeded sliding of piston 76 is ended, and the stiffness of the compliant connection between the holddown mass and the baseplate is increased, so that the resonant frequency of the vibrator-earth system is changed. The number and dimensions of cylinders 72 are chosen so as to produce with some precision the desired change in the resonant frequency. For example, as is discussed above, the vibrator will be swept from about 5 Hertz to about 100 Hertz and if the resonant frequency of the vibrator-earth system with valves 88 open is about 25 Hertz, cylinders 72 might be designed so that the resonant frequency of the vibrator-earth system with valves 88 closed is 70 hertz. However, clearly this is a matter of design choice and the invention is not limited to the selection of specific natural or resonant frequencies.

Figure 5:
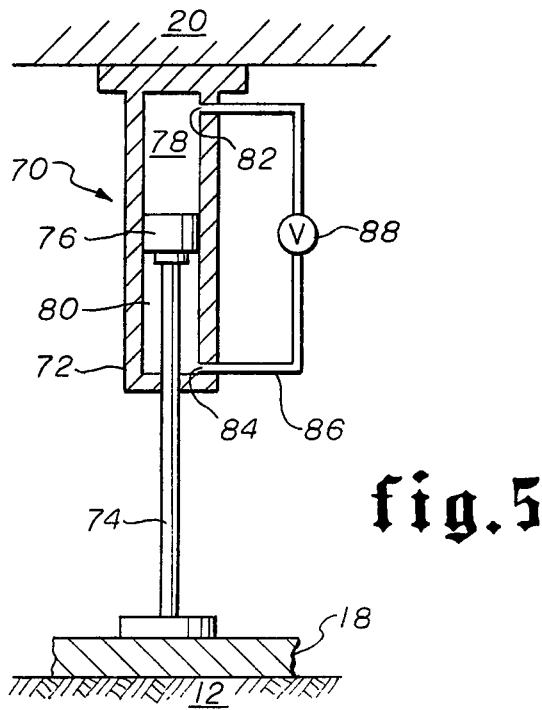
FIG. 5 is a view partly in vertical cross-section and partly schematic showing some details of a variable compliant element disposed between the holddown mass and baseplate.
Figure 6:
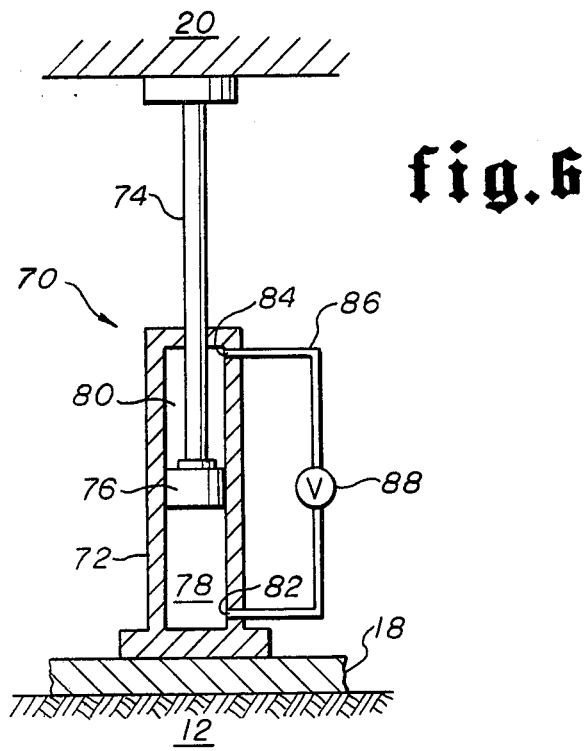
FIG. 6 is a view partly in vertical cross-section and partly schematic showing an alternative way of connecting the variable compliant element of FIG. 5 to the holddown mass and the baseplate.

FIG. 6 illustrates an alternate way of attaching the cylinder and piston assemblies to the holddown mass and baseplate. The cylinder 72 is attached to the baseplate and the piston rod 74 is attached to the holddown mass. In other respects, the assemblies function substantially as those shown in FIG. 5. Because it is desirable to keep the mass of the baseplate small, the arrangement shown in FIG. 5 is preferred, but clearly the arrangement shown in FIG. 6 would fall within the spirit of the invention. In fact, the invention is not limited to hydraulic cylinder and piston assemblies to vary the overall compliant connection between the baseplate and the holddown mass; other means for varying such compliant connection could be used.

FIG. 4 shows the preferred mechanism for closing the valves 88 at the desired frequencies. The sweep signal from electric source 60, in addition to being transmitted to servo valve 54 via conductor 62, is transmitted via conductor 90 to a high pass filter 91, which passes only signals having frequencies above a certain minimum level. In the examples cited above, the high pass filter would be set to pass only those signals having frequencies exceeding 60 Hertz. From filter 91, the signals are transmitted via conductor 92 to a rectifier 93 which produces a direct current signal which is transmitted via conductor 94 to amplifier 96. Alternatively, a frequency discriminator (not shown) which produces a signal whose amplitude is proportional to the frequency of the signal received from source 60 could be used instead of the high pass filter and the rectifier, but the high pass filter and rectifier are preferred. The signal from the rectifier 93 is transmitted by conductor 94 to amplifier 96 and from there by conductor 98 to valves 88 which are normally open, but which close when they receive a signal from amplifier 96. Thus, the valves 88 are closed when the frequency of the sweep signal (and thus the baseplate vibration frequency) exceeds a preselected value. In the examples cited above, this frequency is 60 Hertz.

Figure 7:
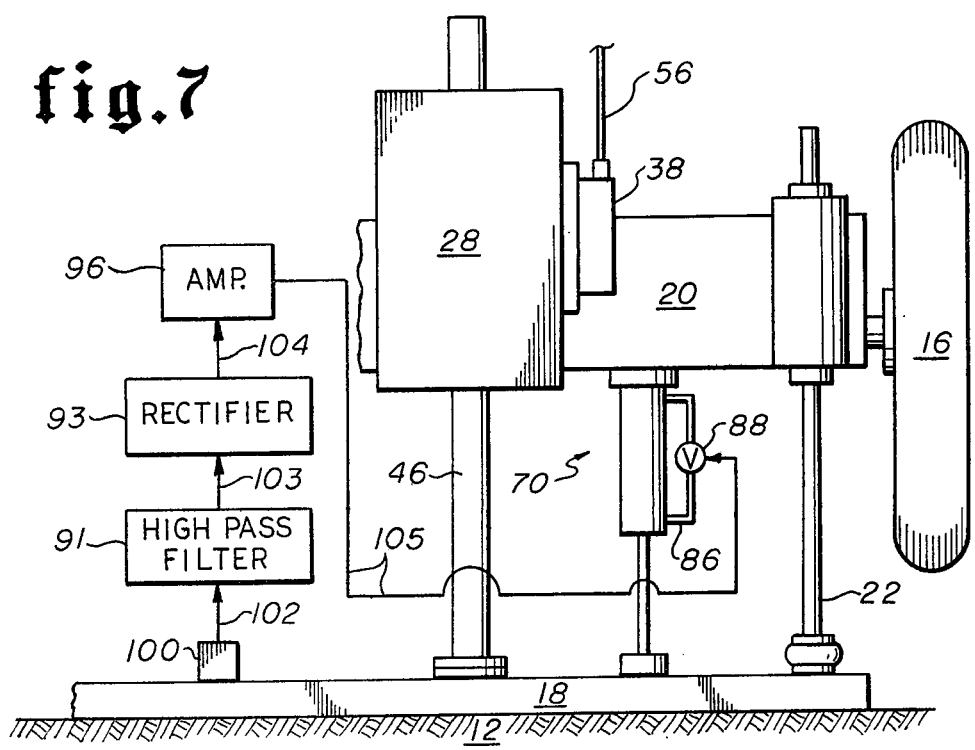
FIG. 7 is a schematic simplified view of a vibrator with a means for directly measuring the frequency of the baseplate vibrations and using such measurement to control the stiffness of the variable compliant elements disposed between the baseplate and the holddown mass.

It will be appreciated that the frequency of the baseplate vibrations could be measured independently of the frequency of the sweep signal generated by the electric source 60. For example, FIG. 7 shows one or more motion detectors, indicated schematically by the numeral 100, mounted on the baseplate. These motion detectors could be accelerometers, velocity detectors, or displacement detectors (which measure the displacement of the baseplate from equilibrium) of the character well known in the art. The signals from the motion detectors are transmitted by conductors 102, 103, and 104 to the high pass filter, rectifier and amplifier, processed as is described above, and transmitted by conductor 105 to valves 88. Signals from amplifier 96 control the valves 88 so that the valves are open when the baseplate vibration frequency is below a preselected level and are closed when the baseplate vibration frequency is above a preselected level. However, the use of the sweep signal from the electric source for this purpose is felt to be simpler and more reliable and thus constitutes the preferred embodiment of the invention.

In operation, the vibrator is moved to a selected location, hydraulic pistons 26 are activated so that baseplate 18 is lowered to the earth and holddown mass 20 bears on the baseplate through support rods 22 and springs 24. Electric source 60 generates an input or sweep signal of desired characteristics which is transmitted to servo valve 54 and high pressure hydraulic fluid is interjected into the hydraulic cylinder on alternate sides of piston 40 to reciprocate the reaction mass 28 and baseplate 18 and thus induce in the baseplate vibrations conforming to the sweep signal. If the sweep signal begins at low frequencies, then initially the valves 88 will be open and the natural frequency of the vibrator-earth system will be in the lower end of the range of interest, say about 25 Hertz. The power output of the vibrator will increase as the sweep signal, and thus baseplate vibrations, approach 25 Hertz and then will begin to decline. At a preselected frequency, say 60 Hertz, the valves 88 will be closed, so that the resonant frequency of the vibrator-earth system changes to a higher frequency, say 70 Hertz. The power output of the vibrator will again begin to increase and will not fall off again until the vibrator passes through this second resonant frequency. If the sweep is begun at the high end of the frequency range of interest, then initially valves 88 are closed, and are opened after the sweep signal and baseplate vibration frequency fall below a preselected level.

It will be appreciated that the invention described above is not necessarily limited to the use of only two values for the stiffness of the variable complaint connection between the baseplate and the holddown mass, but that if desired various combinations of hydraulic cylinders and solenoid-operated valves as described could be used to create more than two resonant frequencies for the vibrator-earth system as the vibrator is swept through the desired range of frequencies.

The foregoing disclosure and description of the invention are illustrative and explanatory thereof, and various changes in size, shape and materials, as well as in the details of the illustrated construction may be made with the scope of the appended claims without departing from the spirit of the invention.

I claim:

1. An apparatus for controlling the vibrations of a seismic vibrator having a holddown mass and a baseplate, said apparatus comprising:
    at least one compliant element connected to the holddown mass and to the baseplate, said compliant element having a variable stiffness;
    control means connected to the compliant element for varying the stiffness of the compliant element, said control means being responsive to an input signal;
    at least one sensor for measuring the frequency of the baseplate vibrations, said sensor generating a signal indicative of said frequency; and
    means for transmitting the sensor signal to the control means, whereby the stiffness of the compliant element between the holddown mass and the baseplate is controlled according to the frequency of the baseplate vibrations.

2. The apparatus of claim 1, wherein said sensor measures the displacement of the baseplate from equilibrium.

3. The apparatus of claim 1, wherein said sensor measures the velocity of the baseplate.

4. The apparatus of claim 1, wherein said sensor is an accelerometer.

5. The apparatus of claim 1, wherein said compliant element comprises a hydraulic cylinder and a piston slideably disposed within said cylinder and defining within said cylinder two chambers, said chambers containing hydraulic fluid.

6. The apparatus of claim 5, wherein said control means comprises:
    a conduit communicating between said chambers to allow hydraulic fluid to flow between the chambers; and a valve disposed in said conduit, the position of said valve being responsive to the signal from the sensor.

7. An apparatus for controlling the vibrations of a seismic vibrator, said vibrator having a holddown mass, a baseplate, and a driver for vibrating the baseplate, said driver being controlled by an electric sweep signal, said apparatus comprising:

at least one compliant element connected to the holddown mass and to the baseplate, said compliant element having a variable stiffness;

control means connected to the compliant element for varying the stiffness of the compliant element, said control means being responsive to an electric signal; and means for transmitting said electric sweep signal to said control means, whereby the stiffness of the compliant connection between the holddown mass and the baseplate is controlled by the electric sweep signal which also controls the driver.

8. The apparatus of claim 7, wherein said compliant element comprises a hydraulic cylinder and a piston slideably disposed within said cylinder and defining within said cylinder two chambers, said chambers containing hydraulic fluid.

9. The apparatus of claim 8, wherein said control means comprises:

a conduit communicating between said chambers to allow hydraulic fluid to flow between the chambers; and a valve disposed in said conduit, the position of said valve being responsive to said electric input signal.

10. A seismic vibrator, said vibrator comprising in combination:

a baseplate adapted to be coupled to the earth;

a holddown mass connected to the baseplate so as to exert on the baseplate a holddown force which tends to keep the baseplate in contact with the earth;

a reaction mass connected to the baseplate to permit reciprocation of the reaction mass with respect to the baseplate;

a driver connected to the reaction mass for reciprocating the reaction mass with respect to the baseplate in order to vibrate the baseplate, said driver being responsive to electric signals;

an electric source which generates an electric sweep signal to control said driver;

a first conductor connected to the electric source and to the driver for transmitting said sweep signal from said electric source to said driver;

at least one compliant element connected to the holddown mass and to the baseplate, said compliant element having a variable stiffness;

control means connected to the compliant element for varying the stiffness of the compliant element, said control means being responsive to an electric input signal;

a second conductor connected to the electric source and to the control means for transmitting said electric sweep signal to the control means, whereby the stiffness of the compliant connection between the holddown mass and the baseplate is controlled by the sweep signal which also controls the driver.

11. The vibrator of claim 10, wherein said compliant element comprises:

a hydraulic cylinder connected to said holddown mass; a piston slideably disposed within said cylinder and defining within said cylinder two chambers, said chambers containing hydraulic fluid, and a piston rod connected to said piston and to the baseplate.

12. The vibrator of claim 11, wherein said control means comprises:

a conduit communicating between said chambers to allow hydraulic fluid to flow between the chambers; and a valve disposed in said conduit, the position of said valve being responsive to the frequency of said input signal.

13. The vibrator of claim 10, wherein said compliant element comprises:

a hydraulic cylinder connected to said baseplate;

a piston slideably disposed within said cylinder and defining within said cylinder two chambers, said chambers containing hydraulic fluid; and a piston rod connected to said piston and to the holddown mass.

14. The vibrator of claim 13, wherein said control means comprises:

a conduit communicating between said chambers to allow hydraulic fluid to flow between the chambers; and a valve disposed in said conduit, the position of said valve being responsive to the frequency of said input signal.

15. The vibrator of claim 10, wherein said control means changes the stiffness of said compliant element when the sweep signal passes through a preselected frequency.

* * * * *